United States Patent
Burkhart et al.

(10) Patent No.: US 7,196,153 B2
(45) Date of Patent: Mar. 27, 2007

(54) EQUILIBRATION OF SILOXANES

(75) Inventors: Georg Burkhart, Essen (DE); Jurgen Dröse, Essen (DE); Horst Dudzik, Essen (DE); Klaus-Dieter Klein, Mülheim (DE); Wilfried Knott, Essen (DE); Volker Möhring, Mülheim (DE)

(73) Assignee: Goldschmidt AG, Essen (DE)

( * ) Notice: Subject to any disclaimer, the term of this patent is extended or adjusted under 35 U.S.C. 154(b) by 6 days.

(21) Appl. No.: 10/758,490

(22) Filed: Jan. 15, 2004

(65) Prior Publication Data

US 2004/0147703 A1    Jul. 29, 2004

(30) Foreign Application Priority Data

Jan. 16, 2003    (DE)    ................. 103 01 355

(51) Int. Cl.
*C08G 77/08*    (2006.01)
(52) U.S. Cl. ....................................... 528/23
(58) Field of Classification Search .................. 528/23
See application file for complete search history.

(56) References Cited

U.S. PATENT DOCUMENTS

| 3,309,390 | A | * | 3/1967 | Omietanski | 556/459 |
| 3,694,405 | A | * | 9/1972 | Litteral | 528/23 |
| 4,222,952 | A | * | 9/1980 | Vick | 556/462 |
| 4,426,508 | A | * | 1/1984 | Dromard et al. | 528/23 |
| 5,306,737 | A | * | 4/1994 | Burkhart et al. | 521/112 |
| 5,576,408 | A | * | 11/1996 | Igarashi et al. | 528/12 |
| 2006/0155089 | A1 | * | 7/2006 | Ferenz et al. | 528/25 |

FOREIGN PATENT DOCUMENTS

DE    2 152 270    4/1972

* cited by examiner

*Primary Examiner*—Margaret G. Moore
(74) *Attorney, Agent, or Firm*—Frommer Lawrence & Haug LLP

(57) ABSTRACT

The invention relates to a process for the preparation of equilibration products of organosiloxanes by rearrangement of the siloxane bond to a cation exchange resin, the organopolysiloxanes thus obtainable and the use thereof.

12 Claims, No Drawings

EQUILIBRATION OF SILOXANES

RELATED APPLICATIONS

This application claims priority to German application Serial No. 10 301 355.5, filed Jan. 16, 2003, herein incorporated by reference.

BACKGROUND OF THE APPLICATION

1. Field of the Related Art

The invention relates to a process for the preparation of equilibration products of organosiloxanes by rearrangement of the siloxane bond to a cation exchange resin, the organopolysiloxanes thus obtainable and the use thereof

2. Description of the Invention

Equilibrations of siloxanes on ion exchange resins are part of the prior art. Among the multiplicity of known systems, the Amberlyst ion exchanger (in particular Amberlyst® 15) is a frequently used catalytic phase.

Thus, DE-A-21 52 270, which is hereby fully incorporated by reference with regard to the present invention, describes a process for the preparation of equilibration products of organosiloxanes by rearrangement of the siloxane bond on a cation exchange resin, organosiloxane used as starting material or an organosiloxane mixture being allowed to flow at a temperature of about 10° C. to about 100° C. through a packing which contains, as cation exchange resin, a macrocrosslinked cation exchange resin containing sulfo groups and having an average pore volume of at least about 0.01 cm$^3$, and the organosiloxanes which have flowed out being isolated.

In addition to the preparation of nonfunctional polydimethylsiloxanes, the possibility for the preparation of copolymeric dimethylsiloxane/poly(methyl)hydrogensiloxanes by equilibration of a mixture consisting of methylhydrogenpolysiloxane, hexamethyldisiloxane and siloxane cycles on the macrocrosslinked ion exchange phase Amberlyst® 15 is described therein.

Copolymeric dimethylsiloxane/poly(methyl)hydrogensiloxanes are, inter alia, valuable starting materials in the preparation of PU stabilizers, in particular for hot flexible foam systems. On the basis of the teaching of DE-A-21 52 270, an attempt was made to prepare a proven stabilizer system by first bringing a mixture consisting of hexamethyldisiloxane, poly(methyl)hydrogensiloxane and siloxane cycles under the action of Amberlyst® 15 as an acidic catalyst at 95° C. into equilibration equilibrium, then subjecting it to a rearrangement reaction with a mixture of allylpolyethers with linkage of SiC bonds to the siloxane backbones under the catalytic action of a platinum metal complex.

However, the polyethersiloxane obtained thereby was in the form of a turbid liquid whose stabilizing activity in the foaming of flexible foam systems is limited in such a way that collapse results when they are used as a stabilizer.

OBJECT OF THE INVENTION

An object to be achieved consisted in finding a system which permits the equilibration of siloxanes carrying SiH groups, so that these disadvantages along the further processing route are avoided. These and other objects are apparent from the following Description of the Invention.

DESCRIPTION OF THE INVENTION

This invention provides for, inter alia, a process for the preparation of equilibration products of organosiloxanes by rearrangement of the siloxane bond, said process comprising reacting at least two organosiloxanes in the presence of a macrocrosslinked cation exchange resin containing sulfonic acid groups at a temperature of about 10° C. to about 120° C., optionally in the presence of a solvent, and isolating the equilibrated organosiloxanes, wherein said macrocrosslinked cationic exchange resin has a P value $P \geq 2.2 \times 10^{-3}$ m$^3$/kg and A value $\geq 35$ m$^2$/g, where P is the product of the specific surface area and the mean pore diameter of said macrocrosslinked resin and A is the specific surface area of said macrocrosslinked exchange resin.

Surprisingly, it was found that, for example, Lewatit® K 2621, as an ion exchange resin having sulfonic acid groups, enable the equilibration equilibrium to be established sufficiently rapidly and that the hydrogensiloxanes thus obtained are excellent starting materials for the preparation of flexible polyurethane foam stabilizers.

This finding is surprising for a person of ordinary skill in the art since this polymeric resin, as macroporous sulfonated polystyrene, has a chemical parent structure which is identical to that of Amberlyst® 15 and moreover also exhibits similar macroscopic properties, as shown in Table I:

TABLE I

| Ion exchange resin | Surface area A (m$^2$/g) | Mean pore diameter (nm) | P (10$^{-3}$m$^3$/kg) |
|---|---|---|---|
| Amberlyst ® 15 | 45 | 25 | 1,125 |
| Lewatit ® K 2621 | 40 | 65 | 2,600 |

In the process in a preferred embodiment, low molecular weight, in particular linear organopolysiloxanes are depolymerized and equilibrated. In particular, an organosiloxane which is present in the equilibrium of the chemical compounds is isolated. In particular, an organosiloxane whose viscosity is up to about 10 000 cP is used as starting material. Especially preferred are organopolysiloxanes that are low moleculart weight organopolysiloxanes, such as those, for example, that contain from 3 to 200 silicon atoms.

In a further embodiment, a cation exchange resin whose mean pore diameter is at least about 65 nm and whose average specific surface area is about 30 to 50 m$^2$/g is used.

The rearrangement is preferably carried out at a temperature of about 35° C. to about 100° C.

According to the invention, the process in a further embodiment is carried out continuously; a fraction having the desired boiling range is separated from the outflowing organosiloxane mixture, and the fraction having the undesired boiling range is recycled into the feed comprising organosiloxanes.

In particular, a mixture of hexamethyldisiloxane, poly(methyl)hydrogensiloxane and siloxane cycles is used as starting material.

A further embodiment is the use of organosiloxanes for the linkage of SiC bonds, a mixture of these organosiloxanes and allylpolyethers being brought into contact with a platinum metal complex and the polysiloxane obtained being used as a flexible polyurethane foam stabilizer.

With the aid of the present invention, it is possible to prepare statistically uniformly composed organohydrogensiloxanes having a defined equilibrium of linear and cyclic compounds by equilibration of a mixture of methylhydrogenpolysiloxane and cyclic or linear, optionally hydrogen-functionalized polysiloxanes using a defined macro-crosslinked cation exchange resin containing sulfonic acid groups. With regard to these and further definitions, reference is made expressly to DE-A-21 52 270.

It should be stated that all flexible foam stabilizers (polyethersiloxanes) which were prepared on the basis of Amberlyst® 15, Purolite® CT 169 D (surface area 35 to 50 m²/g, mean pore diameter 24.0 to 42.5 nm) or Purolite® CT 165 (surface area 2.5 m²/g, mean pore diameter >100) as an ion exchange system are turbid liquids which lead to collapse of the PU foam. Important parameters for the description of the catalyst phases to be used according to the invention are therefore the specific surface area and the porosity, i.e. the mean pore diameter. If a product of the two variables is calculated, it has the character of an inverse density (volume:mass) and permits a clear differentiation between the ion exchanger capable of functioning and ion exchangers not to be used according to the invention.

For the ion exchanger Lewatit® K 2621 used by way of example, the consideration is as follows:

$$40 \text{ m}^2/\text{g} \times 65 \text{ nm} = 2600 \text{ m}^2 \text{ nm/g} = 2.6 \times 10^{-3} \text{ m}^3/\text{kg}.$$

EXAMPLES

The advantage of the present invention is to be demonstrated on the basis of the following non-limiting examples.

WORKING EXAMPLES

Preparation of the ion exchange resin containing sulfonic acid groups and used in the example according to the invention and in the example not according to the invention Lewatit® K-2621 in the commercial form having a high water content was placed in open evaporation dishes for a period of 18 hours in a drying oven heated to 60° C. and then transferred in the still warm state in the absence of moisture to vessels having an inert atmosphere and was stored.

Amberlyst® 15 was used directly in the commercial form containing 5% of water.

Example 1

Preparation of a Hydrogensiloxane (Example According to the Invention)

A mixture consisting of 223.0 g of decamethylcyclopentasiloxane (D$_5$), 20.2 g of poly(methyl)hydrogensiloxane PTF1 (SiH content: 15.75 eq/kg) and 6.9 g of hexamethyldisiloxane HMDS (61.5 mol of D$_5$: 0.135 mol of PTF1: 0.865 mol of HMDS) was mixed with 3 mol % of predried ion exchange resin Lewatit® K-2621 and equilibrated for 6 hours at 95° C. with continuous stirring and, after cooling of the reaction mixture, the ion exchange resin was separated by filtration. The content of active SiH was determined with the aid of gas volumetry (decomposition of a weighed siloxane sample with the aid of a sodium butylate solution) as 1.26 eq/kg. The viscosity of the hydrogensiloxane was 86.4 mPa·s (25° C.).

$^{29}$Si-NMR spectroscopy assigned to the hydrogensiloxane obtained according to the invention an average structure which could be represented by the following formula:

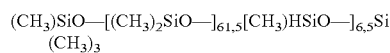

Comparative Example 1

Preparation of a Hydrogen Siloxane

A mixture consisting of 223.0 g of decamethylcyclopentasiloxane (D$_5$), 20.2 g of poly(methyl)hydrogensiloxane PTF1 (SiH content: 15.75 eq/kg) and 6.9 g of hexamethyldisiloxane HMDS (61.5 mol of D$_5$: 0.135 mol of PTF1: 0.865 mol of HMDS) was mixed with 3 mol % of ion exchange resin Amberlyst® 15 and equilibrated for 6 hours at 95° C. with continuous stirring and, after cooling of the reaction mixture, the ion exchange resin was separated by filtration. The content of active SiH was determined with the aid of gas volumetry as 1.26 eq/kg. The viscosity of the hydrogensiloxane was 80.3 mPa·s (25° C.).

$^{29}$Si-NMR spectroscopy assigned to the hydrogensiloxane obtained in this manner the following average structure:

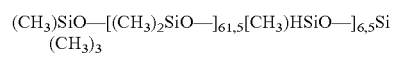

Example 2

(Further processing of the hydrogensiloxane obtained in example 1 to give a polysiloxane/polyoxyalkylene block copolymer)

259.2 g (0.185 mol) of a polyether of the average formula

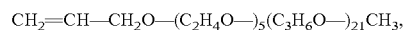

86.4 g (0.062 mol) of a polyether of the average formula

234.5 g (0.061 mol) of a polyether of the average formula

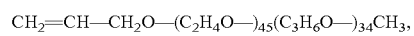

156.4 g (0.041 mol) of a polyether of the average formula

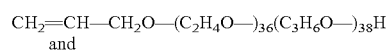

and 37.0 g (0.061 mol) of a polyether of the average formula

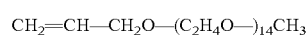

were initially introduced together with 15.4 mg of cis-(NH$_3$)$_2$PtCl$_2$ into a flask provided with a dropping funnel, stirrer, thermometer, gas inlet and reflux condenser. The apparatus was blanketed by means of a gentle nitrogen stream. After heating to 120° C., 240 g (=0.301 mol of SiH) of the hydrogensiloxane from example 1 was added dropwise in the course of 30 minutes. The reaction mixture was allowed to continue reacting for 3 hours, and a quantitative SiH conversion (determined by gas volumetry by reaction with sodium butylate solution) was achieved. After filtration over a Seitz-K-300 filter disk, a clear, slightly yellowish product was obtained.

Comparative Example 2

(Further processing of the hydrogensiloxane obtained in comparative example 1 to give a polysiloxane (polyoxyalkylene block copolymer)

Analogously to example 2,259.2 g (0.185 mol) of a polyether of the average formula

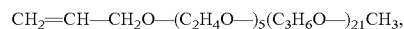

86.4 g (0.062 mol) of a polyether of the average formula

234.5 g (0.061 mol) of a polyether of the average formula $$CH_2=CH-CH_2O-(C_2H_4O-)_{45}(C_3H_6O-)_{34}CH_3,$$

156.4 g (0.041 mol) of a polyether of the average formula $$CH_2=CH-CH_2O-(C_2H_4O-)_{36}(C_3H_6O-)_{38}H$$

and 37.0 g (0.061 mol) of a polyether of the average formula $$CH_2=CH-CH_2O-(C_2H_4O-)_{14}CH_3$$

were initially introduced together with 15.4 mg of cis-$(NH_3)_2PtCl_2$ into a flask provided with a dropping funnel, stirrer, thermometer, gas inlet an reflux condenser. The apparatus was blanketed by a gentle nitrogen stream. After heating to 120° C., 240 g (=0.301 mol of SiH) of the hydrogensiloxane not according to the invention and from comparative example 1 were added dropwise in the course of 30 minutes. The reaction mixture was allowed to continue reacting for 3 hours, and a quantitative SiH conversion (determined by gas volumetry by reaction with sodium butylate solution) was achieved. In spite of the quantitative SiH conversion, the polysiloxane/polyether copolymer obtained was a turbid opaque, slightly yellowish liquid which did not become clear even after filtration over a Seitz-K-300 filter disk.

Example 3/Comparative Example 3

The testing of the performance characteristics of the foam stabilizers prepared was carried out using a foam formulation in the following manner:

In each case 300 parts of a commercial polyether for the preparation of flexible polyurethane foams, which had three hydroxyl groups in the average molecule and had a molecular weight of 3 500, were mixed with 15 parts of water, 15 parts of a physical blowing agent, the corresponding amount of foam stabilizer to be tested, according to example 2 according to the invention or comparative example 2, 0.33 part of diethylenetriamine and 0.69 part of tin octanoate, with thorough stirring. After addition of 189 parts of toluene diisocyanate (isomer mixture of 2,4 and 2,6 in the ratio of 4:1), stirring was effected for 7 seconds at 2 500 rpm using a Glatt stirrer, and the mixture was poured into a box open at the top. A fine-pored foam which was characterized by the following parameters formed:
1. The sag of the foam at the end of the rise phase (denoted by "Sag" in table II).
2. The number of cells per centimeter of foam, which was determined by microscopy.

Table II compares the measured values for 2 different concentrations (1.8 parts/1.5 parts) of the stabilizer obtained by the process according to the invention (example 2) and of the stabilizer not prepared according to the invention (product of comparative example 2).

TABLE II

| Example | Sag | Cells per centimeter |
|---|---|---|
| Example 3 | 0.7/1.4 | 15 |
| Comparative example 3 | collapse | n.d. |

The above description is intended to be illustrative and not limiting. Various changes or modifications in the embodiments described herein may occur to those skilled in the art. These can be made without departing from the scope and spirit of the invention.

The invention claimed is:

1. A process for the preparation of equilibration products of organosiloxanes by rearrangement of the siloxane bond, said process comprising reacting at least two organosiloxanes in the presence of a macrocrosslinked polystyrene based cation exchange resin containing sulfonic acid groups at temperature of about 10° C. to about 120° C., optionally in the presence of a solvent, and isolating the equilibrated organosiloxanes, wherein the said macrocrosslinked cation exchange resin has an A value of about 40 m$^2$/g wherein A is the specific surface area of said macrocrosslinked exchange resin; and wherein the mean pore diameter of the macrocrosslinked cation exchange resin is about 65 nm.

2. The process as claimed in claim 1, wherein the at least one of the organosiloxanes has at least one Si—H group.

3. The process as claimed in claim 1, wherein the organosiloxanes are low molecular weight organopolysiloxanes.

4. The process as claimed in claim 1, wherein the low molecular weight organopolysiloxanes have between 2 and 200 silicon atoms.

5. The process as claimed in claim 1, wherein the solvent is an aliphatic hydrocarbon.

6. The process as claimed in claim 1, wherein the isolated equilibrated organosiloxane is an organopolysiloxane.

7. The process as claimed in claim 1, wherein the temperature is about 35 to about 100° C.

8. The process as claimed in claim 1, wherein the organosiloxanes have viscosity of up to about 10,000 cP at room temperature.

9. The process as claimed in claim 1, wherein the process is carried out continuously.

10. The process according to claim 9, wherein the equilibrated organosiloxanes are isolated by fractional distillation and the fraction having the desired boiling range is separated from the fraction(s) having equilibrated organopolysiloxanes having the undesired boiling range(s) and removed and the fraction(s) having the undesired boiling range(s) are recycled back into the feed of the continuous process.

11. The process as claimed in claim 1, wherein at least one of the organosiloxanes is hexamethyldisiloxane, poly(methyl)hydrogensiloxane or a cyclic siloxane.

12. The process according to claim 1 wherein the equilibrated organosiloxanes are further reacted with at least one allylpolyethylene in the presence of a platinum metal complex.

* * * * *